United States Patent [19]
Dube et al.

[11] Patent Number: 5,632,580
[45] Date of Patent: May 27, 1997

[54] MILLING MACHINE EXTENSION

[75] Inventors: Joseph H. Dube, New Bedford; Steven P. Tobiaz, Fall River, both of Mass.

[73] Assignee: The United States of America as represented by the Secretary of the Navy, Washington, D.C.

[21] Appl. No.: 414,885

[22] Filed: Mar. 31, 1995

[51] Int. Cl.⁶ .................... B23Q 3/152; B23C 9/00
[52] U.S. Cl. .................... 409/230; 409/215; 409/233; 409/144; 409/235; 408/234
[58] Field of Search .................... 409/230, 215, 409/216, 233, 231, 232, 144, 235; 408/234, 124

[56] References Cited

U.S. PATENT DOCUMENTS

| | | | |
|---|---|---|---|
| 3,146,813 | 9/1964 | Dirksen | 408/206 |
| 3,269,271 | 8/1966 | Bruckner | 409/233 |
| 3,481,248 | 12/1969 | Engstrom | 409/233 |
| 4,334,811 | 6/1982 | Trumpf et al. | 409/233 |
| 4,548,532 | 10/1985 | Watanabe et al. | 409/233 |
| 4,627,773 | 12/1986 | Ehnert | 409/215 |
| 5,025,548 | 6/1991 | Justesen | 409/144 |
| 5,342,155 | 8/1994 | Harroun | 409/233 |
| 5,403,132 | 4/1995 | Truesdell | 409/233 |

*Primary Examiner*—Daniel W. Howell
*Assistant Examiner*—Christopher Kirkman
*Attorney, Agent, or Firm*—Michael J. McGowan; James M. Kasischke; Prithvi C. Lall

[57] ABSTRACT

A machine tool extension joins a machine tool to a spindle on a milling machine. The machine tool extension has an extension collar with a cavity therethrough and a mouth at either end for joining the collar to the milling machine and the machine tool. An extension shaft is disposed within the extension collar for mounting on the spindle. The shaft has a bar aperture extending axially therethrough. A draw bar is disposed within the bar aperture for holding the machine tool against the extension collar and shaft. The machine tool extension allows machining of parts with deep cavities.

7 Claims, 2 Drawing Sheets

5,632,580

MILLING MACHINE EXTENSION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a spindle extension for providing greater reach for a milling machine and more particularly to a spindle extension for a machine known as a Bridgeport milling machine to extend the right angle reach of the machine.

2. Description of the Prior Art

Bridgeport milling machines are well known, vertical type machines of very versatile application. These machines comprise a base with a work table mounted thereon, a vertical column, and a spindle head joined with a motor. Milling machines of this type have structures on the spindle head which are designed to give stability to the tool. These structures include an outer rim for providing side to side stability, a hollow power transmission shaft concentrically disposed within the outer rim, and a draw bar inserted through the hollow power transmission shaft to hold the tool against the spindle head. A variety of tools are available for this machine which are attached to the spindle head to perform work on a work piece positioned on the worktable. One of the tools available for milling machines of this type provides a right angle extension to allow machining of the interior or exterior of a work piece positioned on the work table. When the work piece has a hollow configuration and machining must be performed on the interior surface of the hollow, the milling machine is often prevented from machining this surface because of contact between the work piece and the horizontal portion of the milling machine. Before this invention, another type of machine was required to perform this operation.

SUMMARY OF THE INVENTION

Accordingly, it is a general purpose and object of the present invention to provide a means for machining parts having deep cavities.

It is a further object that such means be usable with existing tools and machinery.

Another object is that such means provide safety and stability during machining.

These objects are accomplished with the present invention by providing a machine tool extension that joins a machine tool to a spindle on a milling machine. The machine tool extension has an extension collar with a cavity therethrough and a mouth at either end for joining the collar to the milling machine and the machine tool. An extension shaft is disposed within the extension collar for mounting on the spindle. The shaft has a bar aperture extending axially therethrough. A draw bar is disposed within the bar aperture for holding the machine tool against the extension collar and shaft. The machine tool extension allows machining of parts with deep cavities.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
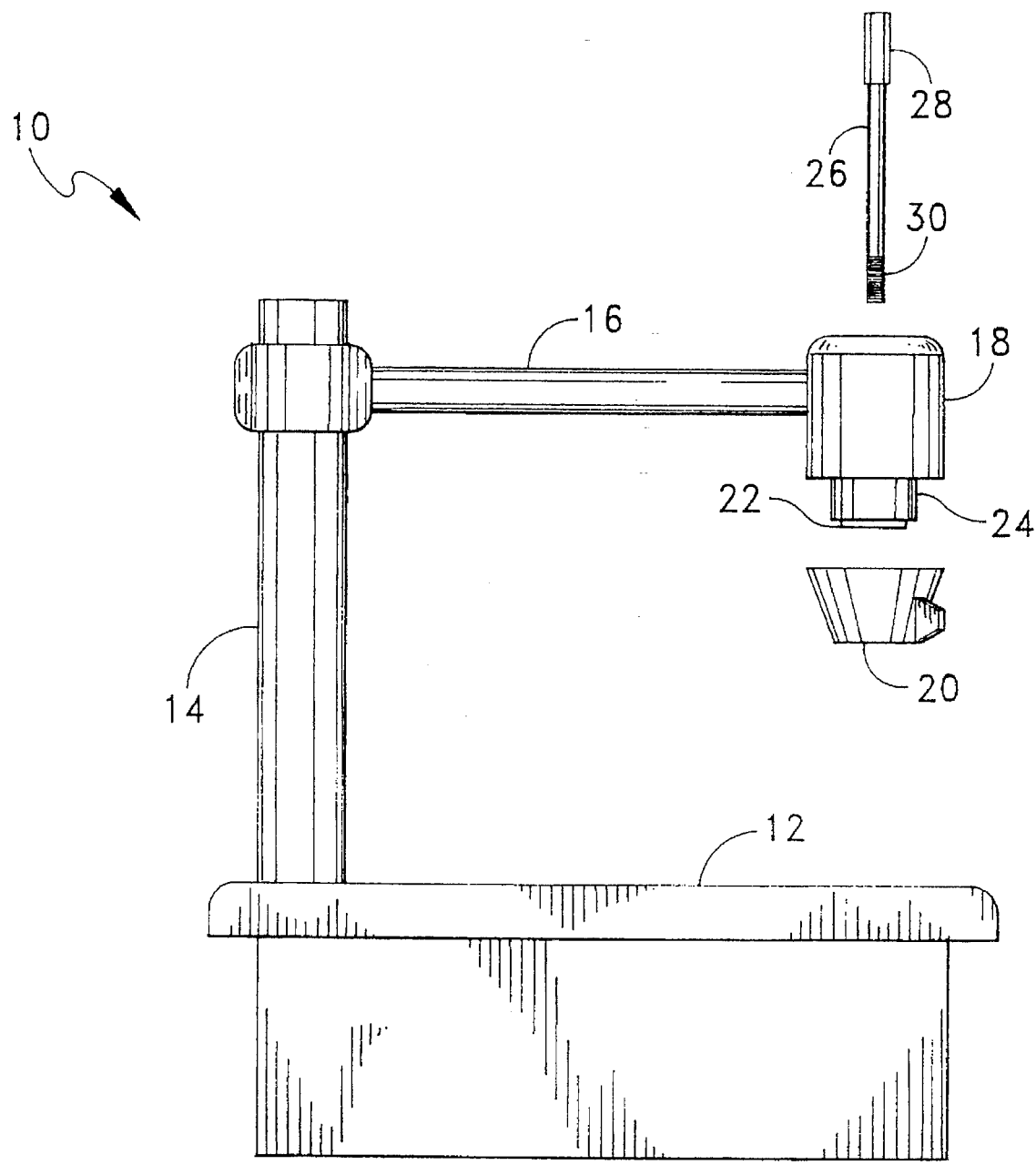
FIG. 1 shows a typical vertical milling machine.

Referring now to FIG. 1 there is shown a vertical milling machine 10 known in the art as a Bridgeport milling machine. Typically, a machine of this type comprises a horizontal work table 12, a vertical support 14, a horizontal support 16, and a spindle head 18. In operation one of a variety of machine tools such as machine tool 20 is mounted on spindle head 18. A spindle 22 within spindle head 18 mates with a shaft inside machine tool 20, and machine tool 20 fits around a mounting shoulder 24 on spindle head 18. A draw bar 26 having a hexagonal wrench head 28 at one end and a threaded portion 30 at the other end is used to secure machine tool 20 against spindle head 18. Draw bar 26 fits through the top of spindle head 18, passes through spindle, and threads into machine tool 20. Machine tool 20 can have an angular configuration like tool 20 shown herein or a straight configuration. A work piece is placed upon work table 12 and spindle head 18 is lowered to perform work on the work piece. With the prior art configuration, work cannot be performed on a work piece having a configuration which will cause interference between horizontal support 16 and the work piece.

Figure 2:
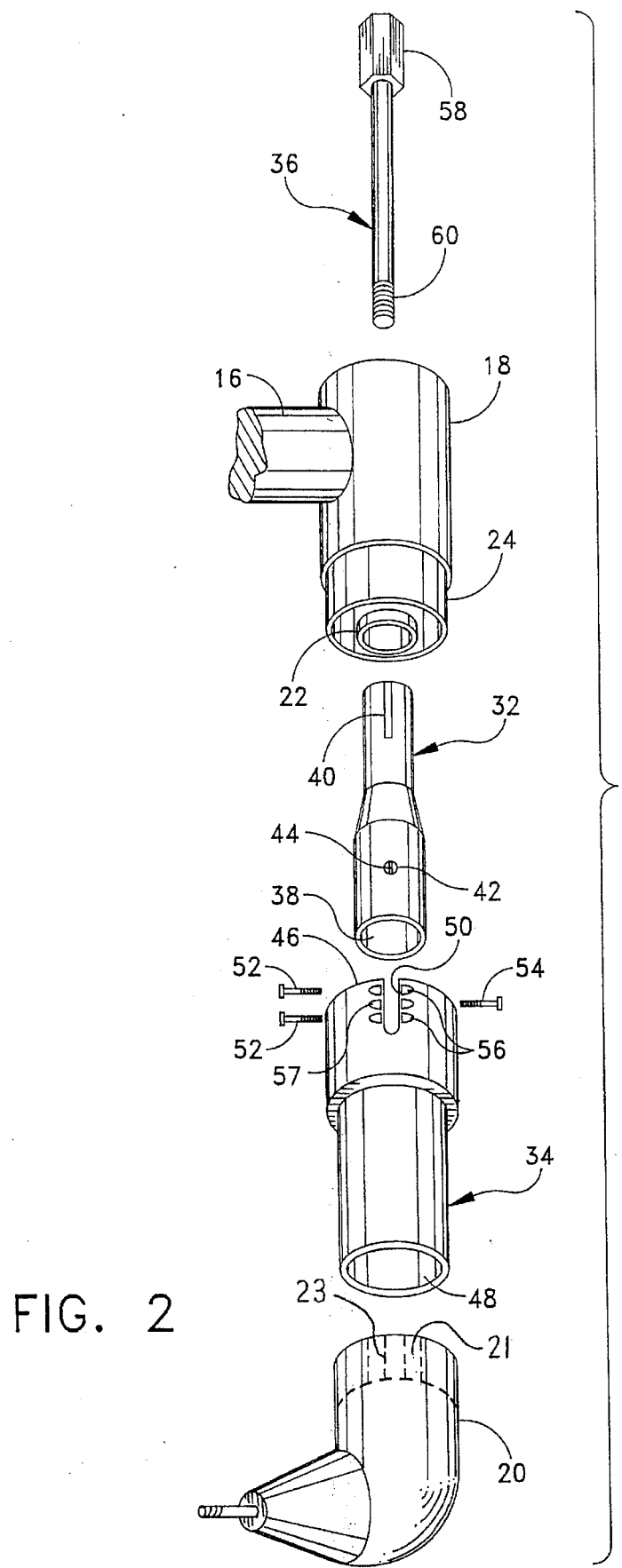
FIG. 2 shows an exploded view of the current invention as attached to the spindle head of a vertical milling machine.

In FIG. 2 there is shown an exploded view of the current invention with spindle head 18 of a typical Bridgeport milling machine. The current invention extends the reach of spindle head 18. It comprises three parts, an extension shaft 32, an extension collar 34, and an extended draw bar 36. Extension shaft 32 is an elongated stepped cylindrical member with a bar aperture 38 extending axially the entire length of the member. The narrow end of extension shaft 32 fits within spindle 22 on spindle head 18 of milling machine 10. A key groove 40 is formed at the surface of the narrow end of extension shaft 32 parallel to the axis of shaft 32. Key groove 40 mates with key (not shown) on the inner surface of spindle 22. Bar aperture 38 through extension shaft 32 widens at the wide end of shaft 32 to accommodate a drive shaft 21 on a tool 20. A key aperture 42 with a set screw 44 therein is present in extension shaft 32 for fixing extension shaft 32 to tool drive shaft 21 at a key groove 23 thereon.

Extension collar 34 is a hollow stepped cylinder having a wider spindle head mouth 46 at one end and a narrower tool mouth 48 at the other end. A slot 50 is formed in spindle head mouth 46. Tightening bolts 52 and an expansion bolt 54 extend through bolt apertures 56, 57 across slot 50 in collar 34. Spindle head mouth 46 has a clearance fit over a mounting shoulder 24 on spindle head 18. The spindle head mouth 46 is joined to milling machine 10 by tightening bolts 52 and reducing the diameter of mouth 46. After loosening tightening bolts 52, removal of the collar can be facilitated by tightening expansion bolt 54 in expansion bolt aperture 57 to increase the diameter of mouth 46. The tool mouth 48 has the same outer diameter as mounting shoulder 24 on spindle head 18 so that tool 20 can be fastened to tool mouth 48.

Extended draw bar 36 is a steel bar with a hexagonal head 58 and a threaded portion 60 at the distal end thereof. Extended draw bar 36 is similar in structure to draw bar 26 except that the rod portion of bar 36 is lengthened to allow mounting of tool 20 on extension collar 34. Draw bar 36 is inserted through the fastening aperture in the top of spindle head 18, through spindle 22 into bar aperture 38 in extension shaft 32 and through extension shaft 32 where threads on draw bar 36 engage threads in tool 20. When draw bar 36 is tightened, tool 20 is pulled into extension collar 34 and secured thereto.

In use, extension shaft 32 fits in spindle 22 of vertical milling machine 10. The extension collar 34 is mated with spindle head 18 of vertical milling machine 10 and tightening bolts 52 on extension collar 34 are tightened to affix collar 34 to milling machine 10. Extension shaft 32 extends through the hollow portion of extension collar 34. Tool 20 is mounted on tool mouth 48 of extension collar 34 with extension shaft 32 mechanically engaging the drive shaft on machine tool 20. Power can be transmitted from spindle 22 via shaft 32 to machine tool 20. Extension collar 34 and extension shaft 32 extend the reach of milling machine 10 to allow milling of features deep within hollow cylinders or cones.

The advantages of the present invention over the prior art are that it allows a standard milling machine to be used to machine features deep within hollow cylindrical parts. Before development of this device, special machines were needed to internally mill deep cylindrical and conic parts. This invention saves a great deal of money by providing added capabilities to existing machines.

What has thus been described is a machine tool extension that joins a machine tool to a spindle on a milling machine. The machine tool extension has an extension collar with a cavity therethrough and a mouth at either end for joining the collar to the milling machine and the machine tool. An extension shaft is disposed within the extension collar for mounting on the spindle. The shaft has a bar aperture extending axially therethrough. A draw bar is disposed within the bar aperture for holding the machine tool against the extension collar and shaft. The machine tool extension allows machining of parts with deep cavities.

Obviously many modifications and variations of the present invention may become apparent in light of the above teachings. For example: the extension collar can be fastened to the spindle head by many means; and the length of the extension is only limited by the stiffness of the apparatus and the increased moment arm between the tool and the spindle head.

In light of the above, it is therefore understood that within the scope of the appended claims, the invention may be practiced otherwise than as specifically described.

What is claimed is:

1. A machine tool extension for joining a machine tool to a spindle on a milling machine comprising:

an extension collar having a cavity therethrough, a wide spindle head mouth at a first end for joining with said milling machine and a narrower tool mouth at a second end for joining with said machine tool;

an extension shaft disposed within said extension collar cavity, said extension shaft having a narrow end with a key groove thereon matching a spindle key on said spindle, said extension shaft being provided to transmit power between said spindle and said machine tool; and an extended draw bar having an elongated body with a wrench head at one end and threading at the distal end thereof, said milling machine spindle having a spindle aperture therethrough, said extension collar having a bar aperture axially therethrough, said extension shaft having an axial bore therethrough, and said machine tool having a threaded draw bar mount aperture therein, said draw bar being inserted through said spindle aperture, through said bar aperture of said collar, and through said extension shaft axial bore into said machine tool draw bar mount aperture to hold said machine tool against said extension collar.

2. The machine tool extension of claim 1 further comprising at least one bolt, said extension collar having a mounting slot formed therein at said spindle head mouth and at least one bolt aperture formed in said collar intersecting said mounting slot, said bolt being disposed in said bolt aperture across said mounting slot for tightening said collar about said milling machine.

3. The machine tool extension of claim 2 further comprising at least one set screw, said machine tool having a drive shaft with a key groove therein and said extension shaft having at least one threaded key aperture therein corresponding to said machine tool drive shaft key groove, said set screw being disposed within said key aperture to rotationally lock said shaft into said machine tool drive shaft.

4. The machine tool extension of claim 2 further comprising at least one expansion bolt, said extension collar having at least one expansion bolt aperture formed in said extension collar intersecting said mounting slot, said expansion bolt being disposed in said expansion bolt aperture across said mounting slot for loosening said extension collar from said milling machine.

5. The machine tool extension of claim 1 further comprising at least one bolt, said extension collar having a mounting slot formed therein at said spindle head mouth and at least one bolt aperture formed in said collar intersecting said mounting slot, said bolt being disposed in said bolt aperture across said mounting slot for tightening said collar about said milling machine.

6. The machine tool extension of claim 5 further comprising at least one set screw, said machine tool having a drive shaft with a key groove therein and said extension shaft having at least one threaded key aperture therein corresponding to said machine tool drive shaft key groove, said set screw being disposed within said key aperture to rotationally lock said shaft in said machine tool drive shaft.

7. The machine tool extension of claim 5 further comprising at least one expansion bolt, said extension collar having at least one expansion bolt aperture formed in said extension collar intersecting said mounting slot, said expansion bolt being disposed in said expansion bolt aperture across said mounting slot for loosening said extension collar from said milling machine.

* * * * *